(12) United States Patent
Hamlet

(10) Patent No.: US 9,501,664 B1
(45) Date of Patent: Nov. 22, 2016

(54) METHOD, APPARATUS AND SYSTEM TO COMPENSATE FOR DRIFT BY PHYSICALLY UNCLONABLE FUNCTION CIRCUITRY

(71) Applicant: Sandia Corporation, Albuquerque, NM (US)

(72) Inventor: Jason Hamlet, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 56 days.

(21) Appl. No.: 14/570,704

(22) Filed: Dec. 15, 2014

(51) Int. Cl.
*G06F 21/71* (2013.01)
*H04L 9/32* (2006.01)

(52) U.S. Cl.
CPC .............. *G06F 21/71* (2013.01); *H04L 9/3278* (2013.01)

(58) Field of Classification Search
CPC ...... G06F 21/602; G06F 21/71; G06F 21/72; G06F 21/75; G06F 21/76; G06F 12/1408; H04L 9/0861; H04L 9/0866; H04L 9/3278; H04L 2209/12
See application file for complete search history.

(56) References Cited

U.S. PATENT DOCUMENTS

| | | | |
|---|---|---|---|
| 3,786,439 A | 1/1974 | McDonald et al. | |
| 5,963,144 A | 10/1999 | Kruest | |
| 6,009,549 A | 12/1999 | Bliss et al. | |
| 6,472,927 B1 | 10/2002 | Desroches | |
| 7,370,190 B2 | 5/2008 | Calhoon et al. | |
| 7,411,436 B2 | 8/2008 | Fang et al. | |
| 7,564,345 B2 | 7/2009 | Devadas et al. | |
| 7,653,197 B2 | 1/2010 | Van Dijk | |
| 7,681,103 B2 | 3/2010 | Devadas et al. | |
| 7,702,927 B2 | 4/2010 | Devadas et al. | |
| 7,757,083 B2 * | 7/2010 | Devadas ................. | G06F 21/31 380/229 |
| 7,818,569 B2 * | 10/2010 | Devadas ................. | G06F 21/31 257/E23.179 |
| 7,839,278 B2 | 11/2010 | Devadas et al. | |
| 7,840,803 B2 | 11/2010 | Clarke et al. | |
| 7,898,283 B1 | 3/2011 | Koushanfar et al. | |
| 7,919,994 B2 | 4/2011 | Walker et al. | |

(Continued)

FOREIGN PATENT DOCUMENTS

WO 2011048126 A1 4/2011

OTHER PUBLICATIONS

Schaller, A., et al., "Eliminating Leakage in Reverse Fuzzy Extractors", IACR Cryptology ePrint Archive 2014 (2014): 741.*

(Continued)

*Primary Examiner* — Jung Kim
*Assistant Examiner* — Christopher Ruprecht
(74) *Attorney, Agent, or Firm* — Blakely, Sokoloff, Taylor & Zafman, LLP

(57) ABSTRACT

Techniques and mechanisms to detect and compensate for drift by a physically uncloneable function (PUF) circuit. In an embodiment, first state information is registered as reference information to be made available for subsequent evaluation of whether drift by PUF circuitry has occurred. The first state information is associated with a first error correction strength. The first state information is generated based on a first PUF value output by the PUF circuitry. In another embodiment, second state information is determined based on a second PUF value that is output by the PUF circuitry. An evaluation of whether drift has occurred is performed based on the first state information and the second state information, the evaluation including determining whether a threshold error correction strength is exceeded concurrent with a magnitude of error being less than the first error correction strength.

20 Claims, 9 Drawing Sheets

(56) References Cited

U.S. PATENT DOCUMENTS

| | | | |
|---|---|---|---|
| 8,032,760 B2 | 10/2011 | Tuyls et al. | |
| 8,198,641 B2 | 6/2012 | Zachariasse | |
| 8,260,708 B2 | 9/2012 | Potkonjak | |
| 8,312,289 B2* | 11/2012 | Bruekers | 713/186 |
| 8,386,801 B2* | 2/2013 | Devadas | G06F 21/31 257/E23.179 |
| 8,386,990 B1* | 2/2013 | Trimberger | H01L 23/544 257/798 |
| 8,418,006 B1* | 4/2013 | Trimberger | G06F 21/10 714/725 |
| 8,510,608 B2 | 8/2013 | Futa et al. | |
| 8,516,269 B1 | 8/2013 | Hamlet et al. | |
| 8,525,169 B1* | 9/2013 | Edelstein | H01L 23/544 257/48 |
| 8,619,979 B2 | 12/2013 | Ficke et al. | |
| 8,782,396 B2 | 7/2014 | Ziola et al. | |
| 8,848,905 B1 | 9/2014 | Hamlet et al. | |
| 8,918,647 B1* | 12/2014 | Wallrabenstein | H04L 63/0853 713/159 |
| 2003/0204743 A1 | 10/2003 | Devadas et al. | |
| 2006/0209584 A1* | 9/2006 | Devadas | G06F 21/31 365/52 |
| 2006/0210082 A1* | 9/2006 | Devadas | G06F 21/31 380/277 |
| 2006/0221686 A1 | 10/2006 | Devadas et al. | |
| 2006/0271792 A1 | 11/2006 | Devadas et al. | |
| 2006/0271793 A1 | 11/2006 | Devadas et al. | |
| 2007/0038871 A1 | 2/2007 | Kahlman et al. | |
| 2007/0044139 A1 | 2/2007 | Tuyls et al. | |
| 2007/0183194 A1 | 8/2007 | Devadas et al. | |
| 2007/0200608 A1 | 8/2007 | Fang et al. | |
| 2008/0044027 A1 | 2/2008 | Van Dijk | |
| 2008/0059809 A1 | 3/2008 | Van Dijk | |
| 2008/0077792 A1 | 3/2008 | Mann | |
| 2008/0112530 A1 | 5/2008 | Jensen et al. | |
| 2008/0141364 A1 | 6/2008 | Skoric et al. | |
| 2008/0231418 A1 | 9/2008 | Ophey et al. | |
| 2009/0013178 A9 | 1/2009 | Silverbrook | |
| 2009/0083833 A1 | 3/2009 | Ziola et al. | |
| 2009/0157994 A1 | 6/2009 | Hampel et al. | |
| 2009/0222672 A1 | 9/2009 | Clarke et al. | |
| 2009/0254981 A1* | 10/2009 | Devadas | G06F 21/31 726/5 |
| 2009/0327747 A1* | 12/2009 | Bruekers | G07C 9/00087 713/189 |
| 2010/0031065 A1* | 2/2010 | Futa | H03K 3/0315 713/194 |
| 2010/0078636 A1 | 4/2010 | Zachariasse | |
| 2010/0085075 A1 | 4/2010 | Luzzi et al. | |
| 2010/0085101 A1 | 4/2010 | Walker et al. | |
| 2010/0118795 A1 | 5/2010 | Hassan | |
| 2010/0127822 A1 | 5/2010 | Devadas | |
| 2010/0146261 A1 | 6/2010 | Talstra et al. | |
| 2010/0177898 A1 | 7/2010 | Tuyls et al. | |
| 2010/0272255 A1* | 10/2010 | Devadas | G06F 21/31 380/44 |
| 2010/0283585 A1 | 11/2010 | Anderson et al. | |
| 2010/0293612 A1 | 11/2010 | Potkonjak | |
| 2010/0306550 A1 | 12/2010 | Kevenaar et al. | |
| 2011/0002461 A1 | 1/2011 | Erhart et al. | |
| 2011/0050279 A1 | 3/2011 | Koushanfar et al. | |
| 2011/0055649 A1 | 3/2011 | Koushanfar et al. | |
| 2011/0055821 A1 | 3/2011 | Tanaka et al. | |
| 2011/0148457 A1 | 6/2011 | Abramovici | |
| 2011/0215829 A1 | 9/2011 | Guajardo Merchan et al. | |
| 2011/0239002 A1 | 9/2011 | Beckmann et al. | |
| 2011/0317829 A1 | 12/2011 | Ficke et al. | |
| 2012/0002803 A1 | 1/2012 | Adi et al. | |
| 2012/0179952 A1* | 7/2012 | Tuyls | G06F 21/73 714/768 |
| 2012/0204023 A1 | 8/2012 | Kuipers et al. | |
| 2013/0051552 A1 | 2/2013 | Handschuh et al. | |
| 2013/0082733 A1 | 4/2013 | Shimizu | |
| 2013/0185611 A1* | 7/2013 | Goettfert | G06F 11/1008 714/766 |
| 2013/0194886 A1* | 8/2013 | Schrijen | G06F 7/588 365/226 |
| 2013/0246881 A1* | 9/2013 | Goettfert | H03M 13/00 714/752 |
| 2014/0089685 A1* | 3/2014 | Suzuki | H04L 9/0866 713/193 |
| 2014/0100807 A1* | 4/2014 | Rosenblatt | G06F 21/44 702/82 |
| 2014/0133652 A1* | 5/2014 | Oshida | H04L 9/0866 380/255 |
| 2014/0225639 A1* | 8/2014 | Guo | H03K 3/84 326/8 |
| 2014/0325237 A1* | 10/2014 | Van Der Leest | G06F 21/72 713/189 |
| 2014/0325241 A1* | 10/2014 | Shimizu | G06F 21/75 713/192 |
| 2014/0327469 A1* | 11/2014 | Pfeiffer | H03K 19/003 326/8 |
| 2014/0328481 A1* | 11/2014 | Morioka | H04L 9/3278 380/28 |
| 2015/0026545 A1* | 1/2015 | Yu | H04L 1/0042 714/780 |
| 2015/0046718 A1* | 2/2015 | Meyer | H04L 9/0866 713/189 |
| 2015/0188717 A1* | 7/2015 | Wu | G09C 1/00 380/44 |
| 2015/0192637 A1* | 7/2015 | Falk | G06F 21/55 326/16 |
| 2016/0087805 A1* | 3/2016 | Li | H04L 9/0866 713/193 |
| 2016/0148664 A1* | 5/2016 | Katoh | G11C 13/0059 365/148 |
| 2016/0156476 A1* | 6/2016 | Lee | H04L 9/3278 380/44 |
| 2016/0182045 A1* | 6/2016 | Mai | G09C 1/00 326/8 |

OTHER PUBLICATIONS

Kirkpatrick, M. et al., "Software techniques to combat drift in puf-based authentication systems", Workshop of Secure Component and System Identification (SECSI '10), 2010.*

Armknecht et al., "Memory Leakage-Resilient Encryption Based on Physically Unclonable Functions", *Towards Hardware-Intrinsic Security* 2010; 135-164.

Beckmann et al., "Hardware-Based Public-Key Cryptography with Public Physically Unclonable Functions", *Information Hiding* 2009; 5806: 206-220.

Blomstrom, "Protection of digital designs from illegal copying", *Malardalen University Sweden Master Thesis* 2009; 1-74.

Eisenbarth et al., "Reconfigurable Trusted Computing in Hardware", *STC '07 Proceedings of the 2007 ACM workshop on Scalable Trusted Computing* 2007; 15-20.

Guajardo et al., "Anti-counterfeiting, key distribution, and key storage in an ambient world via physical unclonable functions", *Information Systems Frontiers* 2008; 11(1): 19-41.

Guajardo et al., "Intrinsic Physical Unclonable Functions in Field Programmable Gate Arrays", *ISEE/SECURE 2007 Securing Electronic Business Processes* 2007; 313-321.

Guneysu et al., "Dynamic Intellectual Property Protection for Reconfigurable Devices", *Proceedings: IEEE International Conference on Field-Programmable Technology* 2007; 169-176.

Hammouri et al., "Novel PUF-Based Error Detection Methods in Finite State Machines", *Information Security and Cryptology* 2009; 5461: 235-252.

Holcomb et al., "Power-Up SRAM State as an Identifying Fingerprint and Source of True Random Numbers", *IEEE Transactions on Computers* 2008; 57(11): (14pp.).

U.S. Appl. No. 13/906,628, filed May 31, 2013, Gurrieri et al.

U.S. Appl. No. 13/906,660, filed May 31, 2013, Gurrieri et al.

Borkar, S. et al., "Designing Reliable Systems from Unreliable Components: The Challenges of Transistor Variability and Degradation", Published by the IEEE Computer Society, 2005, 7 pgs.

Borkar, S. "Electronics Beyond Nano-scale CMOS", DAC'06 Proceedings of the 43rd annual Design Automation Conference, Jul. 2006, pp. 807-808.

(56) References Cited

OTHER PUBLICATIONS

Chen, G. et al., "Dynamic NBTI of PMOS Transistors and Its Impact on Device Lifetime," Reliability Physics Symposium Proceedings, 2003 IEEE International. 7 pgs.
Dodis, Y. et al., "Fuzzy Extractors: How to Generate Strong Keys from Biometrics and Other Noisy Data", EUROCRYPT 2004, Incs 3027, International Association for Cryptologic Research, 2004, pp. 523-540.
Hicks, J. et al., "45nrn Transistor Reliability", Intel's 45nm CMOS Technology, Intel Technology Journal, vol. 12, Issue 02, ISSN 1535-864X, Jun. 2006, 16 pgs.
Kirkpatrick, M. et al., "Software Techniques to Combat Drift in PUF-based Authentication Systems", Secure Component and System Identification (SECSI), Cologne, Germany, Apr. 26-27, 2010, 9 pgs.
Kuhn, K. et al., "Managing Process Variation in Intel's 45nm CMOS Technology", Intel's 45nm CMOS Technology, Intel Technology Journal, vol. 12, Issue 02, ISSN 1535-864X, Jun. 2008, 20 pgs.
Mcpherson, J.W. "Reliability Challenges for 45nm and Beyond", 2006 Design Automation Conference, IEEE, pp. 176-181.
Schroder, D.K. et al., "Negative bias temperature instability: Road to cross in deep submicron silicon semiconductor manufacturing", Journal of Applied Physics, vol. 94, No. 1, Jul. 2003, pp. 1-18.
Wang, Y. et al., "Temperature-aware NBTI modeling and the impact of input vector control on performance degradation", Proc. Design Automation and Test in Europe Conference and Exhibition, Apr. 2007, 6 pgs.
Zhang, B. et al., "Modeling of NBTI-Induced PMOS Degradation under Arbitrary Dynamic Temperature Variation", 9th International Symposium on Quality Electronic Design, IEEE 2008, pp. 774-779.
Zheng, R. et al., "Circuit Aging Prediction for Low-Power Operation", IEEE 2009 Custom Integrated Circuits Conference (CICC), 2009, pp. 427-430.
Su, Y. et al., "A Digital 1.6 pJ/bit Chip Identification Circuit Using Process Variations", IEEE Journal of Solid-State Circuits, Jan. 2008, vol. 43, No. 1, pp. 69-77.
Lee, J. W. et al., "A Technique to Build a Secret Key in Integrated Circuits for Identification and Authentication Applications", Computation Structures Group Memo 472, Massachusetts Institute of Technology, Computer Science and Artificial Intelligence Laboratory, 2004, 6 pages.
Kaps, J. et al., "Energy Scalable Universal Hashing", IEEE Transactions on Computers, Dec. 2005, vol. 54, No. 12, pp. 1484-1495.
Kumar, S. et al., "Extended Abstract: The Butterfly PUF Protecting IP on every FPGA", Proceedings of the 2008 IEEE International Workshop on Hardware-Oriented Security and Trust, 2008, 4 pages.
Guajardo, J. et al., "FPGA Intrinsic PUFs and Their Use for IP Protection", Proceedings of the 9th international workshop on Cryptographic Hardware and Embedded Systems, Lecture Notes in Computer Science; vol. 4727, 2007, pp. 63-80.
Dodis, Y. et al., "Fuzzy Extractors: How to Generate Strong Keys from Biometrics and Other Noisy Data", SIAM Journal on Computing, 2008, vol. 38, Issue 1, 18 pages.
Maes, R. et al., "Intrinsic PUFs from Flip-flops on Reconfigurable Devices", $3^{rd}$ Benelux Workshop on Information and System Security, Nov. 2008, 17 pages.
Krawczyk, H., "LFSR-based Hashing and Authentication", Advances in Cryptology—CRYPTO '94, Lecture Notes in Computer Science, vol. 839, 1994, pp. 129-139.
Suh, E. G. et al., "Physical Unclonable Functions for Device Authentication and Secret Key Generation", Proceedings of the 44th annual Design Automation Conference, 2007, pp. 9-14.
Guajardo, J. et al., "Physical Unclonable Functions and Public-Key Crypto for FPGA IP Protection", Philips Research Laboratories, Eindhoven, The Netherlands, 2007, 7 pages.
Gassend, B. et al., "Silicon Physical Random Functions", Computation Structures Group Memo 456, In the proceedings of the Computer and Communication Security Conference, Nov. 2002, Massachusetts Institute of Technology, Computer Science and Artificial Intelligence Laboratory, 15 pages.
Tuyls, P. et al., "Secret Key Generation from Classical Physics, Physical Unclonable Functions", Phillips Research Laboratories, The Netherlands, 2006, 20 pages.
Guajardo, J. et al., "Physical Unclonable Functions and Public-Key Crypto for FPGA IP Protection", Philips Research Europe, Eindhoven, The Netherlands, Sep. 11, 2007, 22 pages.
Bauer, T. et al., "Infrastructure for Nondestructive Real-time Fingerprinting of Integrated Circuits", Laboratory Directed Research and Development Presentation Day, Sandia National Laboratories, Albuquerque, New Mexico, Sep. 14, 2009, 1 page.
Kommerling, O. et al., "Design Principles for Tamper-Resistant Smartcard Processors", Proceedings of the USENIX Workshop on Smartcard Technology on USENIX Workshop on Smartcard Technology, May 10-11, 1999, 13 pages, USENIX Association.
ATIS Telecom Glossary 2007, <http://www.atis.org/glossary/definition.aspx?id=3516 >, retrieved from Internet on Sep. 9, 2010, 2 pages.
Roy, J. A. et al, "Protecting Bus-based Hardware IP by Secret Sharing", Proceedings of the 45th Annual Design Automation Conference, Anaheim, CA, Jun. 2008, 6 pages.
Kirkpatrick, M. et al., "Physically Restricted Authentication and Encryption for Cyber-physical Systems", DHS Workshop on Future Directions in Cyber-physical Systems Security, 2009, 5 pages.
Helinski, R., et al. "A Physical Unclonable Function Defined using Power Distribution System Equivalent Resistance Variations", in Design Automation Conference, 2009 DAC '09. $46^{th}$ ACM/IEEE, Jul. 2009, pp. 676-681.
Lofstrom, K., et al. "IC Identification Circuit using Device Mismatch", 2000 IEEE International Sold-State Circuits Conference, Digest of Technical Papers, (ISSCC) 2000, pp. 372-373.
Su, Y. et al., "A 1.6pj/bit 96% Stable Chip-ID Generating Circuit using Process Variations", 2007 IEEE International Sold-State Circuits Conference, ISSCC 2007/ Session 22/ Digital Circuit Innovations/ 22.5, pp. 406-407.
Helinski, R. et al., "Quality Metric Evaluation of a Physical Unclonable Function Derived from an IC's Power Distribution System", In Proceedings of the $47^{th}$ Design Automation Conference, 2010, pp. 240-243.
Maeda, S. et al., "An Artificial Fingerprint Device (AFD): A Study of Identification Number Applications Utilizing Characteristics Variation of Polycrystalline Silicon TFTs", IEEE Transactions on Electron Devices, vol. 50, No. 6, Jun. 2003, pp. 1451-1458.
Roy, D. et al., "Comb Capacitor Structures for On-Chip Physical Uncloneable Function", IEEE Transactions on Semiconductor Manufacturing, vol. 22, No. 1, Feb. 2009, pp. 96-102.
Petkovic, M., "Remote Patient Monitoring: Information Reliability Challenges", Telsiks 2009, Serbia, Nis, Oct. 2009, pp. 295-301.
"LISA: Maximizing RO PUF's Secret Extraction", 2010 IEEE International Symposium on Hardware-Oriented Security and Trust (HOST), pp. 100-105. 978-1-4224-7812-5/10.

\* cited by examiner (1a) Sample $P_1$ and Determine $W_1 = P_1 \oplus C_1$ (2a) Enroll $W_1$ (3a) Sample $P'_1$ and Determine $W'_1 = P'_1 \oplus C_1$ (4a) Receive $W'_1$ and $W_1$ (5a) Calculate $W'_1 \oplus W_1 = P'_1 \oplus C_1 \oplus P_1 \oplus C_1 = P'_1 \oplus P_1 = e_1$ (6a) Evaluate $e_1$ based on $N_{str}$ and $N_{th}$ (7a) Enroll $W_2 = P_2 \oplus C_2$ and $Q_1 = h(P_2) \oplus P_1$ based on (6a)

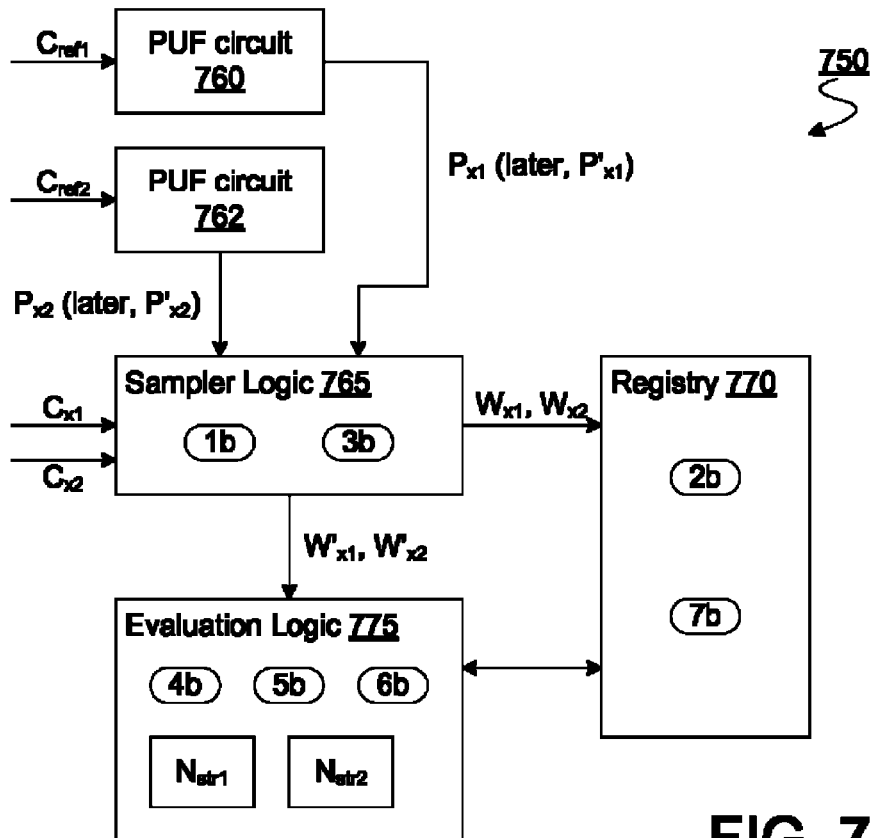

FIG. 7B (1b) Sample $P_{11}$ and $P_{12}$
Determine $W_{11} = P_{11} \oplus C_{11}$
Determine $W_{12} = P_{12} \oplus C_{12}$ (2b) Enroll $W_{11}$ and $W_{12}$ (3b) Sample $P'_{11}$ and $P'_{12}$
Determine $W'_{11} = P'_{11} \oplus C_{11}$
Determine $W'_{12} = P'_{12} \oplus C_{12}$ (4b) Receive $W'_{11}$, $W'_{12}$, $W_{11}$ and $W_{12}$ (5b) Calculate $W'_{11} \oplus W_{11} = P'_{11} \oplus C_{11} \oplus P_{11} \oplus C_{11} = P'_{11} \oplus P_{11} = e_{11}$
Calculate $W'_{12} \oplus W_{12} = P'_{12} \oplus C_{12} \oplus P_{12} \oplus C_{12} = P'_{12} \oplus P_{12} = e_{12}$ (6b) Evaluate $e_{11}$ based on $N_{str1}$ and $e_{12}$ based on $N_{str2}$ (7b) Enroll $W_{21} = P_{21} \oplus C_{21}$ and $Q_{11} = h(P_{21}) \oplus P_{11}$ based on (6)
Enroll $W_{22} = P_{22} \oplus C_{22}$ and $Q_{12} = h(P_{22}) \oplus P_{12}$ based on (6)

METHOD, APPARATUS AND SYSTEM TO COMPENSATE FOR DRIFT BY PHYSICALLY UNCLONABLE FUNCTION CIRCUITRY

STATEMENT REGARDING FEDERALLY SPONSORED RESEARCH

This invention was developed with Government support under Contract No. DE-AC04-94AL85000 between Sandia Corporation and the U.S. Department of Energy. The U.S. Government has certain rights in this invention.

BACKGROUND

1. Technical Field

This disclosure relates generally to trusted computing, and in particular but not exclusively, relates to hardware to protect against subversion by substitution.

2. Background Art

Trustworthy computing (with software) cannot exist without trustworthy hardware to build it on. Even if an integrated circuit is produced using rigorous procedures in a "Trusted Foundry" and certified as "trustworthy," technology must be developed to ensure against wholesale replacement of the component with a separately manufactured but subverted "look-alike" after the point of certification. Without detection of subversion by wholesale component substitution, today's information processing systems are vulnerable to sophisticated adversaries that can fabricate "look-alike" components that perform the same function as the intended component but which may contain additional subversion artifices that can be later triggered by an adversary to disrupt or compromise operation.

Using physical system protection schemes to prevent subversive attacks in deployed information processing hardware is technically difficult and expensive. An alternative to resisting subversive attack with physical system protection schemes is to employ robustly authenticated and protected hardware architectures to enable tracing of the origin of these components. Physically Unclonable Function (PUF) technology may be leveraged to deter adversaries from attempting subversion by insertion of subversive functionality and also by instantiation of counterfeit components (subversion via substitution). PUFs are derived from the inherently random, physical characteristics of the material, component, or system from which they are sourced, which makes the output of a PUF physically or computationally very difficult to predict. Silicon-based microelectronics appear to be a potentially rich source of PUFs because subtle variations in the production processes result in subtle variations in the physical and operational properties of the fabricated devices. Additionally, each device can have millions of exploitable transistors, circuits, and other active and passive components. Accordingly, PUFs extracted from microelectronics are of keen interest because of their potential applications to cyber security.

When using PUF mechanisms are used to support hardware authentication and/or other security techniques, one goal is for PUF circuitry to produce a consistent response throughout the lifetime of an integrated circuit (IC). However, physical characteristics of ICs tend to change over time. For example, negative bias temperature instability (NBTI) effects tend to degrade threshold voltages by tens of millivolts and circuit speeds by tens of percent in sub-65 nm devices. NBTI aging is influenced by temperature, workload, time, and voltage profiles of devices. Since PUF responses are generated from physical characteristics of ICs that originate from manufacturing variation, and since PUFs typically exploit variations in threshold voltage, drive strength, and propagation delay in an IC, it follows that PUF responses will be impacted by device aging.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

FIG. 7B is a functional block diagram illustrating elements of a device to detect for drift of PUF circuitry according to an embodiment.

DETAILED DESCRIPTION

Figure 1A:
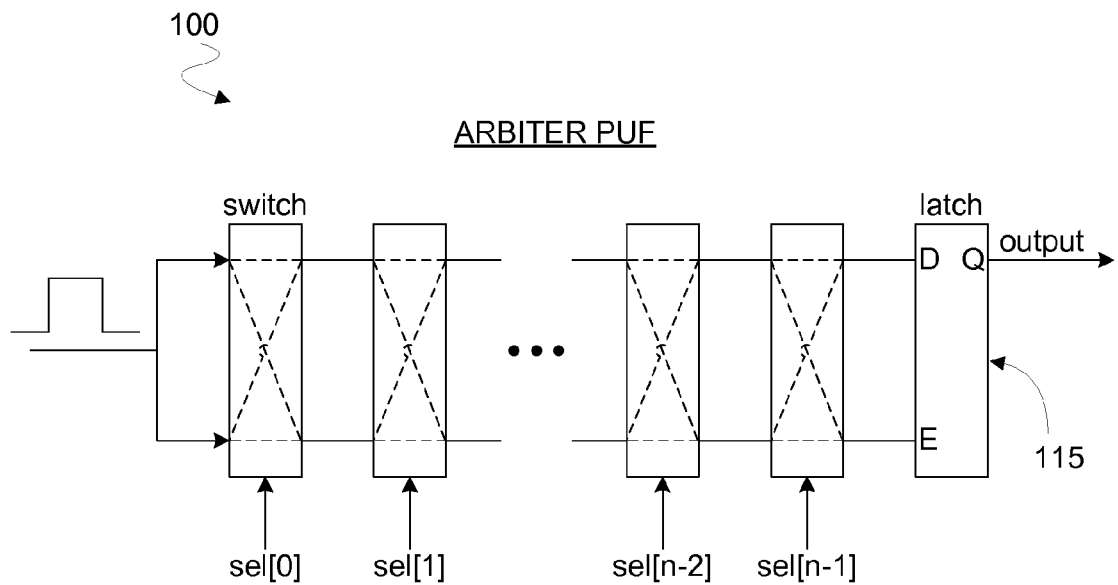
FIG. 1A is a logic circuit diagram of an arbiter type physically unclonable function ("PUF").

Embodiments of a system and method for evaluating performance of a slowly changing data source—e.g. PUF circuitry—are described herein. Features of certain embodiments are discussed herein with respect to techniques and/or mechanisms to detect and compensate for drift of PUF circuitry. However, such discussion may be extended to additionally or alternatively apply to drift detection and/or compensation of any of a variety of other data sources. By way of illustration and not limitation, certain embodiments relate to drift in a source of biometric information such as facial recognition data. Compensation for drift of such biometric data sources may be useful, for example, to automatically accommodate changes in facial recognition data (or other biometric data) which slowly increase as a person grows older.

In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments of the present invention augment the trustworthiness of deployed information processing systems by maintaining a registry of reference information based at least in part on whether drift of PUF circuitry is detected. Certain disclosed embodiments leverage Physical Unclonable Function (PUF) technology for hardware authentication, cryptography and/or any of a variety of security-related mechanisms. PUFs are derived from random physical characteristics within the hardware of a device, which makes a PUF output difficult to predict from one device to another. Information generated based on the PUF output may subsequently be evaluated to determine—e.g., based on whether a magnitude of an error exceeds an error correction capability—if an update to previously-registered reference information is indicated.

PUFs are functions that are derived from the inherently random, physical characteristics of the material or device in which they are built. For example, a silicon PUF may exploit variations in the delay through interconnects and gates or slight differences in threshold voltage. Since the PUF exploits physical variations of the device or material in which it is built, each PUF should provide a unique (although perhaps noisy) response. This property should hold even amongst "identical" devices fabricated with the same process. Moreover, it should be difficult to purposefully produce a PUF with the same output as a given PUF. The quality of a PUF can be measured by interdevice variation and intradevice variation. Ideally, the interdevice variation of a PUF should be near 50% so different devices produce very different output, while the intradevice variation should be near 0% so that a given device consistently provides the same response. In practice, interdevice and intradevice variations will be less than the ideal goals. Additionally, a good PUF should be resistant to changes in temperature and supply voltage.

PUFs can be broadly categorized as delay based and memory based. Delay based PUFs, such as a ring oscillator PUF and an arbiter, measure the difference in delay through "identical" circuits. Memory based PUFs exploit variations in memory structures, such as cross-coupled logic gates and latches and SRAM cells.

Figure 1B:
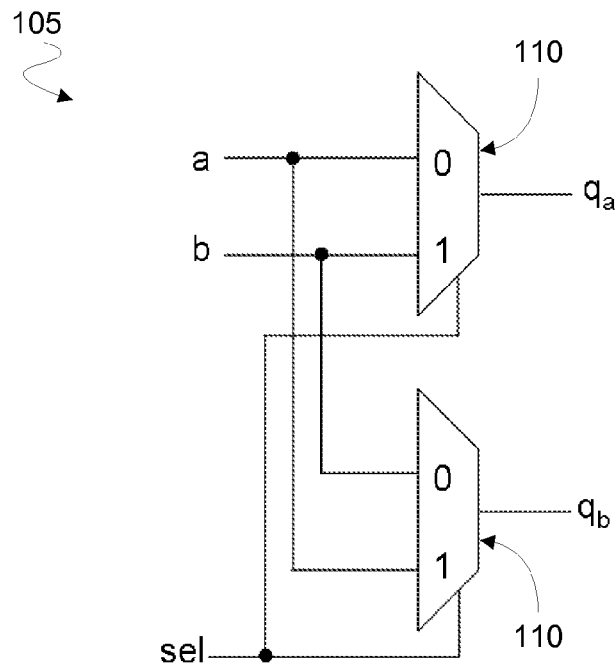
FIG. 1B is a logic circuit diagram of a switch element within an arbiter type PUF.

FIG. 1A is a logic circuit diagram of an arbiter PUF 100. Each stage of arbiter PUF 100 is a switch circuit 105, illustrated in FIG. 1B. FIG. 1B illustrates that switch circuit 105 includes a pair of two input multiplexers 110 with a shared select signal (SEL). When SEL is '1' the upper input a is routed to the lower output, qb, and the lower input b is routed to the upper output, qa. When SEL is '0' the inputs are not crossed over, and the a and b inputs pass straight through the module. Arbiter PUF 100 chains n switch circuits 105 together. At the first stage a pulse is presented to the a and b inputs at the same time. The signal then races along the two paths through the circuit, switching between the lower and upper paths as determined by the SEL input at each stage. After the last stage of arbiter PUF 100, an arbiter (e.g., latch 115) determines the output of the circuit; if the D input arrives first the output is '0' and if the E input arrives first the output is '1'.

Arbiter PUF 100 accepts an n-bit input SEL and produces as output a single bit. This generates a challenge-response pair wherein the challenge is the input, or sequence of inputs, and the response is the output or sequence of outputs. As such, this PUF has an intrinsic challenge-response capability. The PUF output is the response to a particular challenge. To achieve a k-bit response, one may provide k different inputs to a single arbiter PUF 100, evaluate k instantiations of arbiter PUF 100, or some combination thereof.

Figure 2:
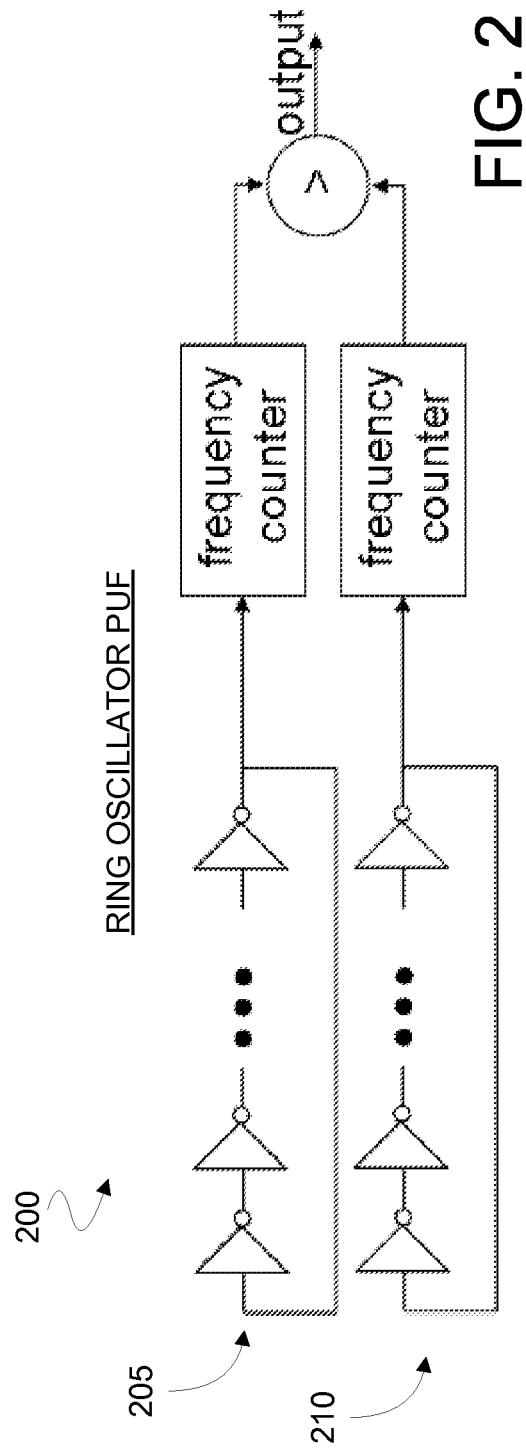
FIG. 2 is a logic circuit diagram of a ring oscillator type PUF.

FIG. 2 is a logic circuit diagram of a ring oscillator PUF 200. Ring oscillator PUF 200 exploits variations in the resonance frequencies of a set of identical ring oscillators 205 and 210. To produce an output bit the resonance frequencies of ring oscillators 205 and 210 are compared and the output bit is determined by which oscillator is fastest. A k bit sequence is produced by making k comparisons between multiple different ring oscillators; however, one should be careful to choose independent, uncorrelated comparisons. If the resonance frequency for oscillator i is $f_{osci}$, then if we have $f_{osc1} > f_{osc2}$ and $f_{osc2} > f_{osc3}$, then $f_{osc1} > f_{osc3}$, and the bit generated by comparing $f_{osc1}$ to $f_{osc3}$ is correlated to the bits produced by the other comparisons. When compared to arbiter PUF 100, disadvantages of ring oscillator PUF 200 include area, speed, and power dissipation. However, ring oscillator PUF 200 is likely easier to implement since it does not require routing two long, almost identical paths across an ASIC or FPGA, as is the case with arbiter PUF 100.

Figure 3:
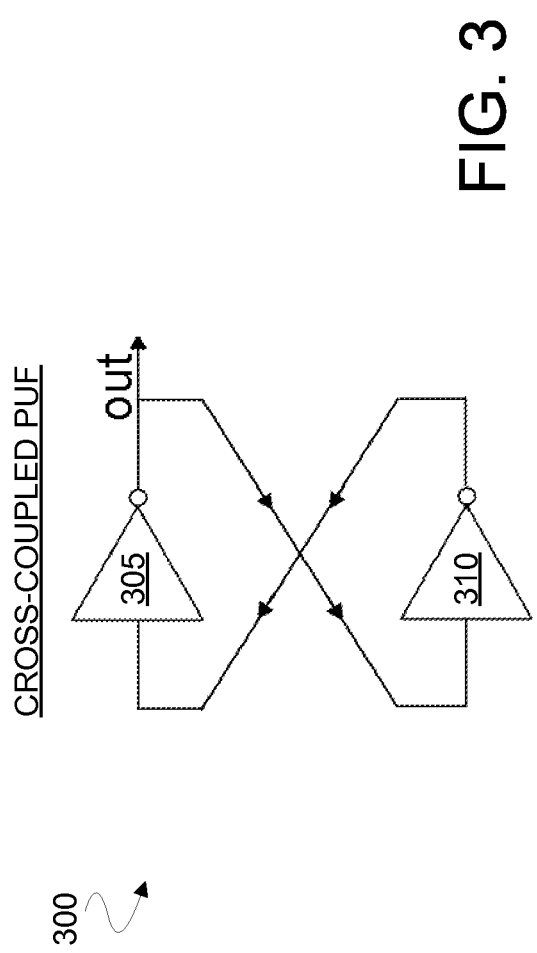
FIG. 3 is a logic circuit diagram of a cross-coupled type PUF.

FIG. 3 is a logic circuit diagram of a cross-coupled PUF 300. Cross-coupled PUF 300 uses a positive feedback loop to store a bit. Without applying any external stimulus, the output of cross-coupled PUF 300 will attain a stable output. The value of this output results from differences in interconnect delay and the voltage transfer characteristics of the inverters 305 and 310. A k bit sequence can be obtained from k cross-coupled inverter pairs. Other logic gates, such as NAND and NOR gates, can also be connected in a cross-coupled configuration to be used as a PUF.

Figure 4:
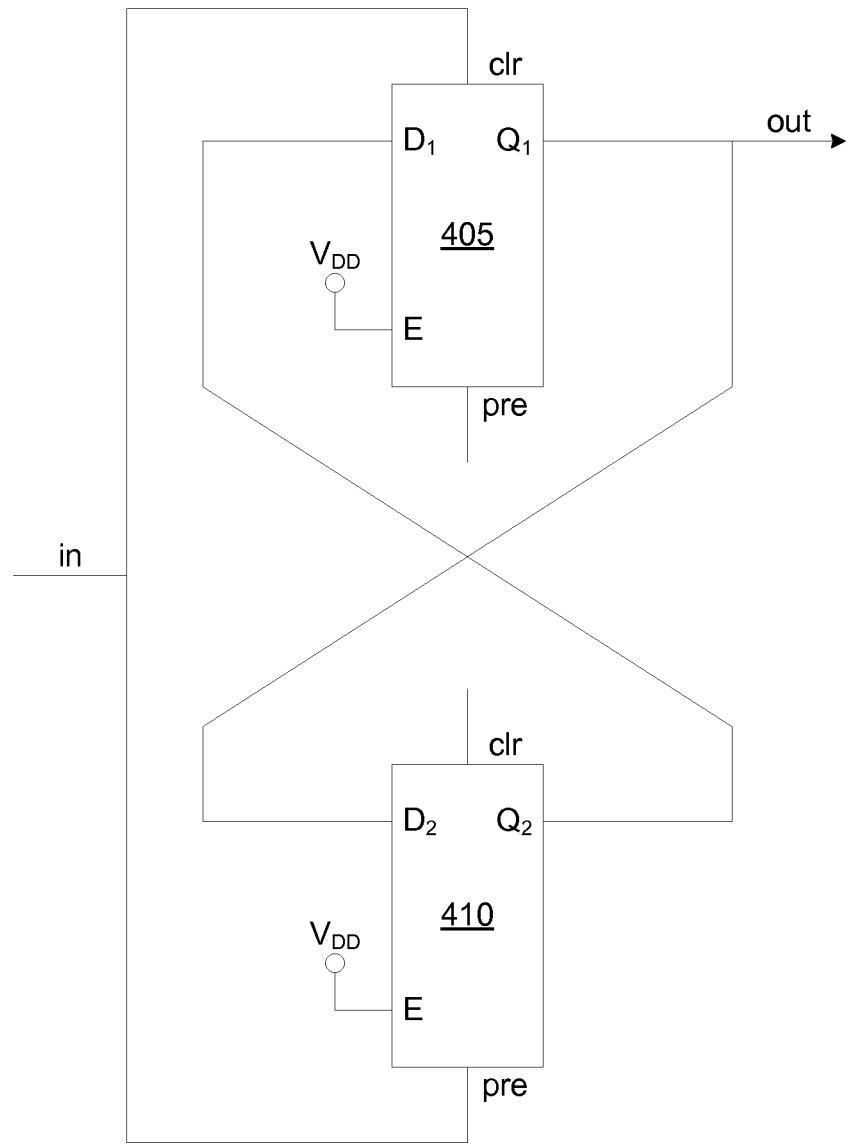
FIG. 4 is a logic circuit diagram of a butterfly type PUF.

FIG. 4 is a logic circuit diagram of a butterfly PUF 400. The illustrated embodiment of butterfly PUF 400 includes cross-coupled D latches 405 and 410. The enable inputs (E) to the latches are tied high so that the D input is always transferred to the Q output. To operate the circuit as a PUF, "in" is set to '1', which causes the active high "clr" and "pre" signals to set Q1='0', Q2='1'. Since the latches are cross-coupled, this forces D1='1' and D2='0'. These inputs are ignored while "in" is asserted. Next, "in" is set to '0', which causes the system to enter an unstable state. At this point the positive feedback loop and differences in wire and latch propagation delays force the output to a stable value. As with cross-coupled PUF 300, k bits are generated by implementing k butterfly PUFs within a given device.

Other PUF circuits, in addition to those illustrated in FIGS. 1-4, may be implemented in connection with embodiments of the invention as well. In fact, a variety of PUFs may be suitable, as long as, a given PUF design has sufficiently small intra-device variation and sufficiently large inter-device variation given a desired level of security. For example, intrinsic PUFs, which are created from a resource that already exists on a chip may be used. In the case of FPGAs, the startup values of SRAM and flip-flops may be leveraged. The primary advantage of intrinsic PUFs is that they are already present on the FPGA, and so only a readout circuit is needed to obtain the value of the PUF. In this sense, fewer FPGA resources are required to implement the function. However, in some cases it may be difficult to read the value of an intrinsic PUF, since SRAM and flip-flop states on FPGAs are commonly forced into a known state upon power up. As such, modification of the bit stream loaded into the FPGA may be necessary for readout.

Typically, noise in PUF responses is compensated for with error-correcting codes and/or by measuring the Hamming distance between an observed response and the expected response. However, if aging causes significant changes in PUF responses—e.g., in a range of tens of percent—then it may be difficult to use PUFs to reliably produce device signatures without making the Hamming distance bounds so weak or the error correction so strong that distinct devices are mistaken for one another. To address these limitations, certain embodiments variously provide techniques and/or mechanisms to reliably generate PUF information despite device aging and drift.

Figure 5:
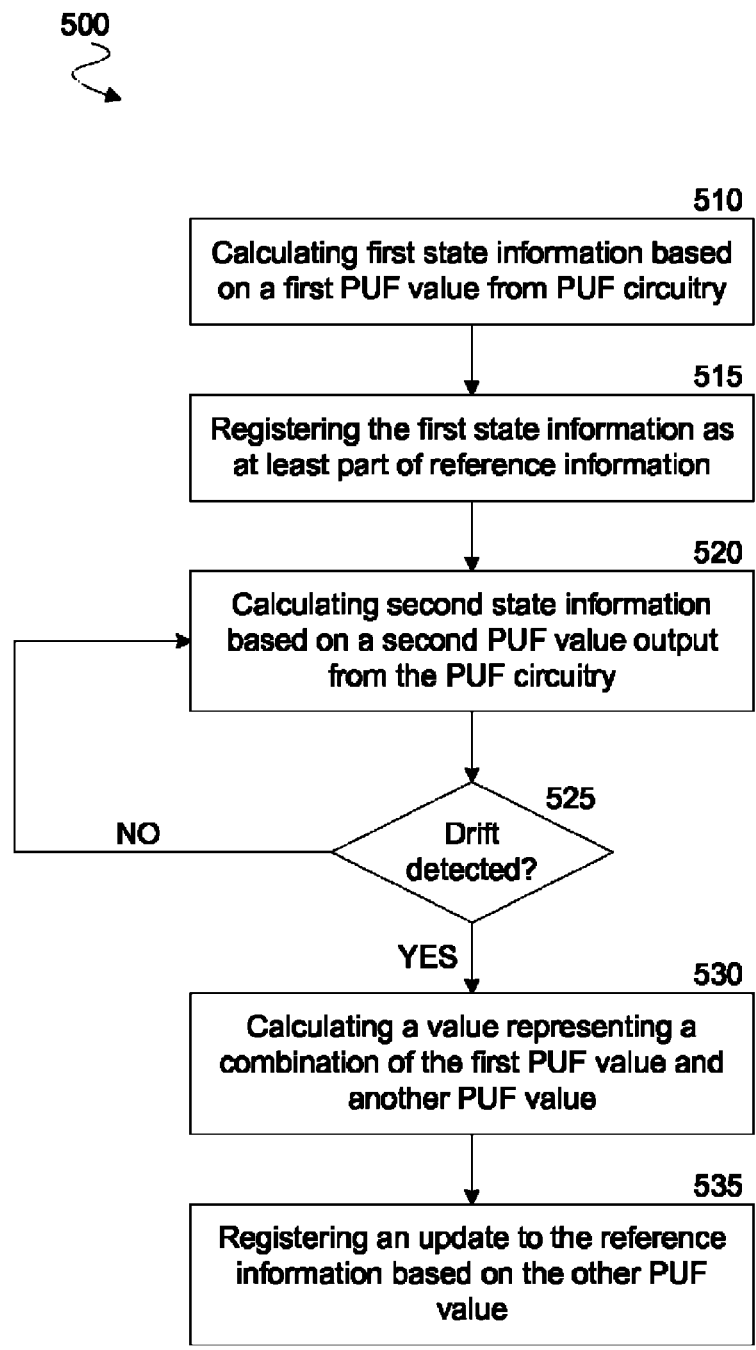
FIG. 5 is a flow diagram illustrating elements of a method for detecting drift by PUF circuitry according to an embodiment.
Figure 6:
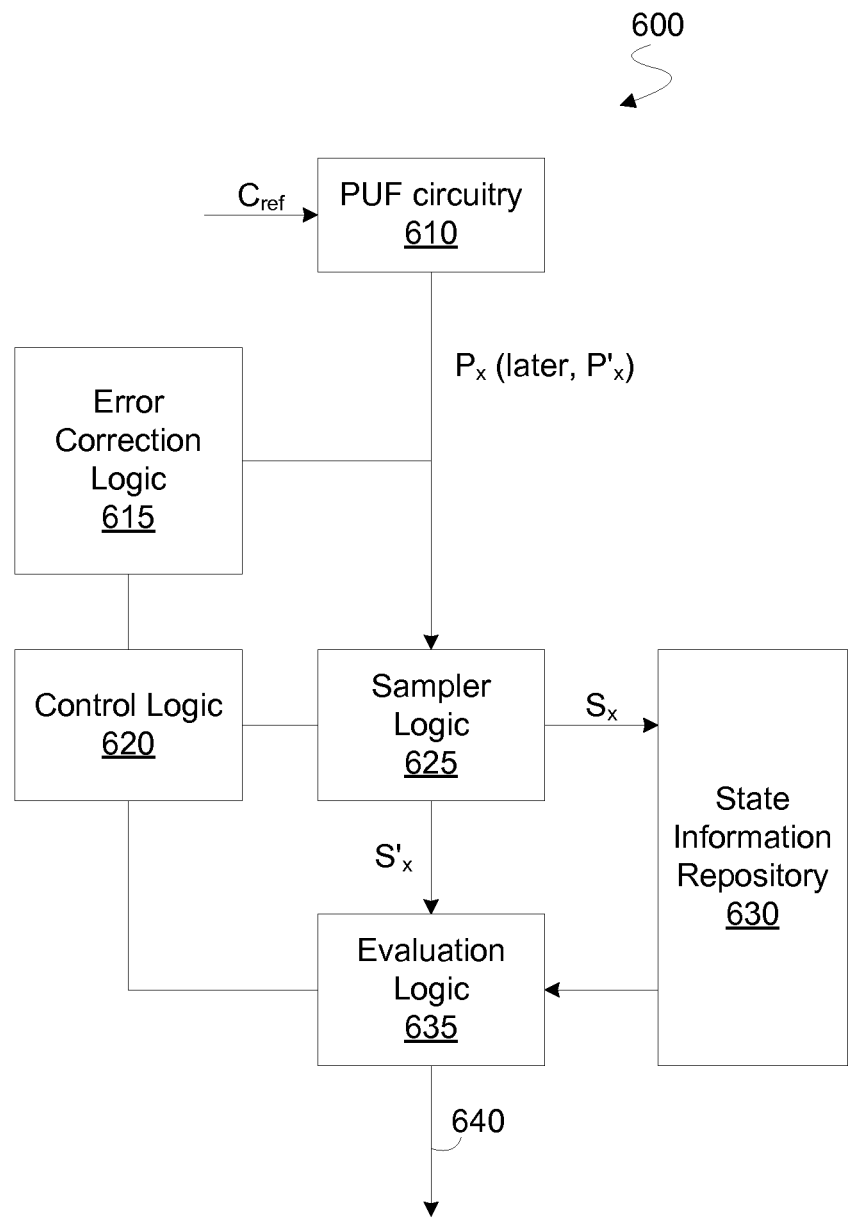
FIG. 6 is a functional block diagram illustrating elements of a system to detect for drift of PUF circuitry according to an embodiment.

FIG. 5 illustrates elements of a method 500 according to an embodiment to support detection of, and compensation for, drift of PUF circuitry. A system 600 to perform some or all of method 500 is illustrated in FIG. 6. System 600 may include any of a variety of computer hardware platforms (or a component thereof) including, but not limited to, a server, desktop computer, laptop computer, handheld device (e.g., a smart phone, palmtop computer, etc.), gaming console, smart television or the like. System 600 may operate to participate in communications with one or more remote hardware platforms (not shown)—e.g., via a local area network (LAN), a wide area network (WAN), a wireless LAN (WLAN), Internet and/or any of a variety of other wired and/or wireless networks. Although features of method 500 are discussed herein in the context of system 600, any of a variety of other systems or devices may similarly provide detection/compensation of PUF drift, as discussed herein.

Method 500 may comprise, at 510, calculating first state information based on a first PUF value that is output from PUF circuitry. For example, system 600 may include or couple to PUF circuitry 610 to generate a PUF value $P_x$ in response to a challenge input $C_{ref}$. PUF value $P_x$ may be provided from PUF circuitry 610 of system 600 to sampler logic 625 of system 600—in response to control logic 620. PUF circuitry 610 may include one or more PUF circuits having, for example, some or all of the features of PUF circuits 100, 200, 300, 400. Sampler logic 625 may comprise hardware, firmware and/or executing software to perform one or more calculations to generate such first state information. The first state information may correspond to a particular error correction strength—e.g., by virtue of an error correction strength which system 600 provides for $P_x$. As used herein, "error correction strength" refers generally to some maximum potential to correct one or more errors in data. For example, a given error correction strength may include a maximum number of erroneous bits of data (and/or a maximum number of multi-bit data symbols) which a given error correction mechanism is capable of correcting.

By way of illustration and not limitation, one or more PUF values—e.g., including $P_x$—may be additionally or alternatively provided from PUF circuitry 610 to error correction logic 615 of system 600. Based on such one or more PUF values, circuitry of error correction logic 615 may generate error correction information that, for example, is to be made available to correct an error in a PUF value subsequently output by PUF circuitry 610. Any of a variety of conventional error correction techniques may be adapted by error correction logic 615, according to different embodiments. The particular details of such conventional error correction techniques are not discussed herein to avoid obscuring various features of certain embodiments. Depending on a particular error encoding technique implemented, an error correction strength which error correction logic 615 provides for a given PUF value may be limited to a particular maximum number of correctable bits.

Calculation of the first state information at 510 may comprise providing the first PUF value as an operand for a function that, for security purposes, is to generate an encrypted, randomized or otherwise obscured version of the first PUF value. Certain embodiments are discussed here in with respect to the use of an exclusive-OR function ("XOR," also represented by the symbol $\oplus$) in the processing and/or retrieval of PUF values. However, certain embodiments are not limited to such use of an XOR function, and such discussion may be extended to additionally or alternatively apply to any of a variety of other suitable functions.

In one embodiment, calculating the first state information at 510 may comprise circuitry of sampler logic 625 (or other such logic) XOR'ing some or all of the first PUF value with a random value. In another embodiment, the calculating at 510 may comprise XOR'ing some or all of the first PUF value with error correction information. Such error correction information may comprise a codeword (or codewords) generated based on an encoding of at least a portion of the first PUF value. The codeword may be calculated, for example, according to a Bose-Chaudhuri-Hocquenghem (BCH) encoding scheme, a Reed-Solomon (RS) encoding scheme, or the like.

Method 500 may further comprise, at 515, registering the first state information as at least part of reference information that, for example, is to be made available for one or more uses including a detection of drift by the PUF circuitry. In some embodiments, one or more other values used to calculate the first state information—e.g., a random number, error correction information and/or the like—may be stored locally at system 600 for later retrieval and use in the detection of PUF circuitry drift. The registering at 515 may include, for example, sampler logic 625 providing state information Sx to only a state information repository 630 that is included in system 600. State information repository 630 may include any of a variety of volatile and/or non-volatile data storage media of system 600 including, but not limited to, random access memory (RAM), dynamic RAM (DRAM), static RAM (SRAM), flash memory and/or the like. In an alternate embodiment, state information repository 630 may be distinct from system 600—e.g., where state information repository 630 is part of a certified authority or other remote agent (not shown) that couples to system 600 via a network. In such an embodiment, system 600 may transmit to the remote agent a public key or other cryptographic information that includes, or is based on, state information Sx.

After registering the first state information at 525, method 500 may, at 520, calculate second state information based on a second PUF value that is output from the PUF circuitry subsequent to the first PUF value. By way of illustration and not limitation, the registering at 515 may be followed by one or more operations including general-purpose use of the PUF circuitry. Such general-purpose use (e.g., as distinguished from operation of the PUF circuitry in support of drift detection) may be for system 600 to support authentication, authorization, cryptographic and/or other such security functionality. The particular details of such security functionality are not limiting on certain embodiments, and may include operations adapted from conventional PUF-techniques.

During or after such general-purpose use, control logic 620 may prepare (e.g., based on a timer, counter or other trigger) for operations to determine whether PUF circuitry 610 has experienced drift—e.g., at least above some predetermined threshold amount—since the registering at 515. Accordingly, control logic 620 may signal for sampler logic 625 to receive from PUF circuit 610 another PUF value (such as P'x) which potentially represents an erroneous version of the first PUF value (e.g., Px). The second state information may be calculated at 520 may include performing one or more calculations similar to those for calculating the first state information, wherein the second PUF value is used in lieu of the first PUF value. Such second state information may be output by sampler logic 625, as represented by the illustrative state information S'x.

Method 500 may further comprise, at 525, detecting—based on the first state information and the second state information—drift of the PUF circuitry. For example, control logic 620 may signal for evaluation logic 635 of system 600 to receive both S'x and Sx. In one embodiment, the detecting at 525 includes determining whether a threshold error correction strength is exceeded concurrent with a magnitude of error being less than the first error correction strength. For example, the detecting at 525 may include calculating an error vector based on the first state information and the second state information. Such an error vector may indicate a Hamming distance between the first PUF value and the second PUF value—e.g., wherein a total number of bits of a given value (e.g., "1") in the error vector equals a total number of erroneous bits of the second PUF value.

In such an embodiment, the total number of erroneous bits may be compared to a first value which represents the first error correction strength, and further compared to a second value which represents the threshold error correction strength. The second value may be an a priori parameter value which, for example, is chosen by design to represent some level of error correction that is lower than, but considered to be significantly close to, the first error correction strength. In some embodiments, the second value may correspond (for example) to a second error correction strength which is provided for a different type of PUF value (not shown) output by PUF circuitry 610.

Where at least a threshold level of drift is not detected at 525—e.g., where the threshold error correction strength is not exceeded—method 500 may later perform another calculation of second state information 520. Any such repetition of the calculation at 520 may be during or after further general-purpose use of the PUF circuitry while the first state information remains registered as reference information. For example, evaluation logic 635 may generate a signal 640 (e.g., to be communicated to control logic 620) indicating whether another calculation of P'x is to take place before an update to the reference information in state information repository 630 might be made.

By contrast, detection of at least a threshold level of drift at 525 may include determining that the threshold error correction strength is exceeded concurrent with the magnitude of error being less than the first error correction strength. In response, method 500 may, at 530, calculate a value representing a combination of the first PUF value and another PUF value (e.g., the second PUF value) generated by the PUF circuitry subsequent to the first PUF value. The value calculated at 530 may provide an encrypted, randomized or otherwise obscured version of Px, while allowing for retrieval of Px even if further drift of PUF circuit 610 results in the first error correction strength being exceeded (with respect to error correction decoding to recalculate the first PUF value based on a later output by the PUF circuit). The calculating at 530 is possible at least insofar as the first PUF value (e.g., Px) is retrievable from the second PUF value (e.g., P'x) while the magnitude of any error of P'x is less than the first error correction strength. In an embodiment, the calculating at 530 is performed by sampler logic 625 (or other logic of system 600) in response to signal 640.

In response to detection at 525 of at least a threshold level of drift, method 500 may additionally or alternatively perform, at 535, registering an update to the reference information based on the other PUF value. The registering at 535 may include one or more operations corresponding to the registering performed at 515. In an embodiment, the registering at 535 includes registering the second state information to serve as an update to (e.g., a replacement of) the registered first state information. The updated reference information corresponds to—e.g., represents—a state of the PUF circuitry at a time of the drift detected at 525. Method 500 may comprise additional operations (not shown) to subsequently detect one or more times (each time based on previously updated reference information) whether later, additional drift by the PUF circuitry indicates a need to again update the registered reference information. Such additional operations may include some or all of the features of operations 520, 525, 530, 535.

In another embodiment, a more general version of method 500 may be performed to detect and compensate for drift of any of a variety of data sources (e.g. including a PUF circuit or a biometric data source). By way of illustration and not limitation, such a method may provide for a source of biometric data—e.g. a face, fingerprint, retina, ear and/or other body part of a person or animal—to serve as a functional equivalent to the PUF circuitry of method 500. In such an embodiment, a first sampling of biometric data based on the biometric data source may serve as a functional equivalent to the first PUF value. Furthermore, a second, later-in-time sampling of biometric data, based on the same biometric data source, may serve as a functional equivalent to the second PUF value. Accordingly, the first sampled biometric data and second sampled biometric data may be processed—e.g., according to techniques similar to those discussed herein with respect to the first PUF value and the second PUF value—to detect and compensate for drift of the biometric data source.

Figure 7A:
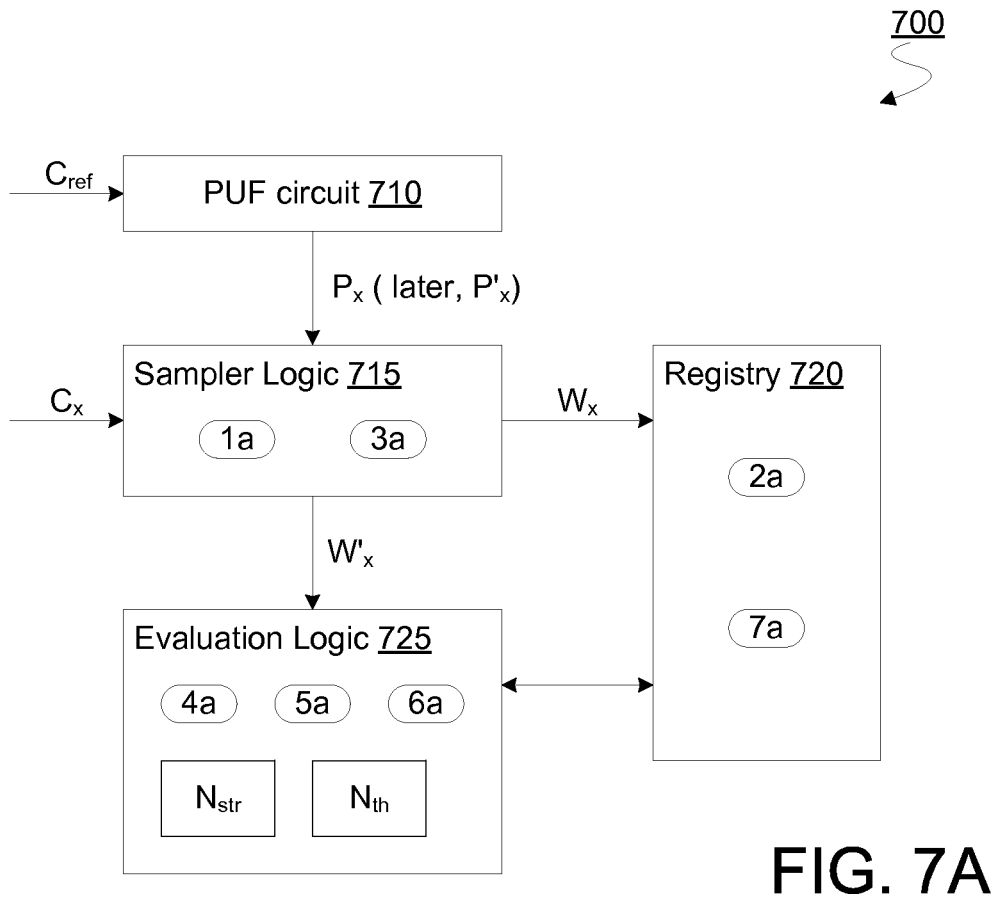
FIG. 7A is a functional block diagram illustrating elements of a device to detect for drift of PUF circuitry according to an embodiment.

FIG. 7A illustrates elements of a device 700 according to an embodiment to compensate for drift of PUF circuitry. In an embodiment, device 700 includes some or all of the features of system 600. For example, device 700 may include a PUF circuit 710, sampler logic 715, registry 720 and evaluation logic 725 which functionally correspond, respectively, to PUF circuitry 610, sampler logic 625, state information repository 630 and evaluation logic 635. Device 700 may include hardware to perform one or more operations of method 500.

For example, FIG. 7A shows various exchanges of PUF values Px, P'x and associated state information Wx, W'x generated based on a value Cx (where "x" represents a given round drift detection/compensation). In an embodiment, PUF circuitry 710 generates a PUF value $P_1$ based on a received reference input $C_{ref}$. The input $C_{ref}$ may be some predetermined baseline value (e.g., a string of "0" bits) which is further to be used for PUF circuit 710 to generate one or more subsequent versions of $P_1$. A subsequent version of $P_1$—which, due to drift of PUF circuit 710, may include one or more erroneous data bits—is represented as $P'_1$.

As represented by operation (1a), sampler logic 715 may sample a first PUF value $P_1$ and perform operations, corresponding to the calculating at 510, to determine first state information $W_1$ based on $P_1$ and $C_1$. Although certain embodiments are not limited in this regard, $W_1$ may be calculated as $(P_1 \oplus C_1)$. In an embodiment, $C_1$ is error correction information that, for example, is generated by error correction logic (not shown) included in or coupled to device 700. Such error correction information may be generated based on encoding of at least part of $P_1$, for example. In another embodiment, $C_1$ is a random number. As represented by operation (2a), registry 720 may subsequently receive $W_1$ from sampler logic 715 and enroll (e.g., store) $W_1$ as part of operations which, for example, correspond to the registering at 515.

As represented by operation (3a), sampler logic 715 may sample a second PUF value $P'_1$ and perform operations, corresponding to the calculating at 520, to determine second state information $W'_1$ based on $P'_1$ and $C_1$. Although certain embodiments are not limited in this regard, $W'_1$ may be calculated as $(P'_1 \oplus C_1)$. Subsequently, evaluation logic 725 may perform operations (4a) through (6a), corresponding to the determining at 525, to detect for at least a threshold level of drift by PUF circuit 710. For example, evaluation logic 725 may receive information including a value $N_{str}$ representing a first error correction strength which error correction logic (not shown) of device 700 provides for $P_x$. Such information may further include a value Nth representing some threshold error correction strength which is less that the first error correction strength. In one illustrative embodiment, $N_{th}$ is one-eighth of $N_{str}$. However, the particular value of $[N_{th}:N_{str}]$ may vary widely according to implementation-specific details, and may be selected based, for example, on a desired sensitivity to drift by PUF circuit 710. In an embodiment, evaluation logic 725 accesses registry 720 and sampler logic 715 to determine $W_1$ and $W'_1$. Based on $W_1$ and $W'_1$, evaluation logic may perform calculations to determine an error vector $e_1$ indicating a total number of errors in $P'_1$. At operation (6a), evaluation logic 725 may evaluate $e_1$ to determine whether the total number of errors is both less than (in some embodiments, less than or equal to) $N_{str}$ and, concurrently, greater than $N_{th}$.

As represented by operation (7a), evaluation logic 725 may—in response to operation (6a)—signal that registry 720 is to receive other state information $W_2$ and enroll (e.g., store) $W_2$ as part of operations that, for example, correspond to the registering at 535. Although certain embodiments are not limited in this regard, $W_2$ may be calculated as $(P_2 \oplus C_2)$—e.g., where $W_2$ is calculated by sampler logic 715. $P_2$ may be $P'_1$, for example. In an embodiment, $C_2$ includes error correction information which is generated based on an error correction encoding of at least part of $P_2$.

Alternatively or in addition, operation (7a) may include registry 720 receiving and enrolling a value $Q_1$ representing a combination of the $P_1$ and $P_2$. By way of illustration and not limitation, $Q_1$ may be calculated as $[h(P_2) \oplus P_1]$, where $h(P_2)$ is a hash of $P_2$. The storing of $Q_1$ allows for secure recovery and use of $P_1$ even after drift of PUF circuit 710 has resulted in the first error correction strength being exceeded (with respect to error correction decoding to recalculate $P_1$). One benefit achieved by this fact is that device 700 may continue to use one or more already-existing cryptographic keys that were previously generated (and in an embodiment, published) based on $P_1$.

In an embodiment, device 700 may further repeat, one or more times, at least some of the operations shown in FIG. 7A. For example, device 700 may further sample another PUF value $P'_2$ from PUF circuit 710 and determine state information $W'_2$—e.g., where $W'_2$ is calculated as $(P'_2 \oplus C_2)$. Based on $W_2$ and $W'_2$, evaluation logic 725 may calculate an error vector $e_2$ indicating a total number of errors in $P'_2$. Evaluation logic 725 may then determine whether the total number of errors is both less than (in some embodiments, less than or equal to) $N_{str}$ and greater than $N_{th}$. Based on such a determination, evaluation logic 725 may output one or more signals indicating that registry 720 is to enroll new state information $W_3$ (such as $W'_2$) and/or a new value $Q_2$ corresponding to a recent PUF value $P_3$—e.g., $P'_2$—output by PUF circuitry.

FIG. 7B illustrates elements of a device 750 according to an embodiment to compensate for drift of PUF circuitry. In an embodiment, device 750 includes some or all of the features of system 600 and/or device 700. For example, device 750 may include sampler logic 765, registry 770 and evaluation logic 775 which functionally correspond, respectively, to sampler logic 625, state information repository 630 and evaluation logic 635. Device 750 may further include a PUF circuits 760, 762 which, for example may be included in PUF circuitry 610. PUF circuits 760, 762 may be distinct from one another, in an embodiment. Alternatively, one of PUF circuits 760, 762 may be a component of the other of PUF circuits 760, 762. Device 750 may include hardware to perform one or more operations of method 500.

For example, FIG. 7B shows various exchanges of PUF values $P_{x1}$, $P_{x2}$, $P'_{x1}$, $P'_{x2}$ and associated state information $W_{x1}$, $W_{x2}$, $W'_{x1}$, $W'_{x2}$ variously generated based on values $C_{x1}$, $C_{x2}$ (where "x" represents a given round drift detection/compensation). In an embodiment, PUF circuits 760, 762 generate PUF values $P_{11}$, $P_{12}$ each based on a respective one of reference inputs $C_{ref1}$, $C_{ref2}$. The inputs $C_{ref1}$, $C_{ref2}$ may be challenges which are further used for PUF circuits 760, 762 to generate one or more subsequent versions of $P_1$, $P_2$ (represented as $P'_1$, $P'_2$, respectively). In an embodiment, $C_{ref1}$ and $C_{ref2}$ are the same reference value (e.g., a string of "0" bits).

Device 750 may include or couple to circuit logic (not shown)—e.g., including some or all of the features of error correction logic 615—to provide error correction for PUF values variously generated by PUF circuits 760, 762. In one embodiment, such error correction is characterized by a first error correction strength for $P_{11}$ and a second error correction (different from the first error correction strength) for $P_{12}$. The first error correction strength and the second error correction strength may be represented by values $N_{str1}$, $N_{str2}$—e.g., the values each representing a respective maximum number of erroneous data bits which may be corrected. Device 700 is discussed herein with respect to an embodiment wherein the first error correction strength for PUF circuit 760 is greater than the second error correction strength for PUF circuit 762—e.g., where $N_{str1} > N_{str2}$. However, certain embodiments are not limited in this regard.

As represented by operation (1b), respective state information $W_{11}$, $W_{12}$ may be determined based on $P_{11}$, $P_{12}$ and values $C_{11}$, $C_{12}$. For example, $W_1$ may be calculated as $(P_{11} \oplus C_{11})$ and $W_{12}$ may be calculated as $(P_{12} \oplus C_{12})$. In an embodiment, $C_{11}$ includes error correction information that, for example, is generated based on encoding of at least part of $P_{11}$. Similarly $C_{12}$ may include error correction information generated based on encoding of at least part of $P_{12}$. In another embodiment, one or both of values $C_{11}$, $C_{12}$ are random numbers and/or $C_{11}$ and $C_{12}$ are equal to one another.

As represented by operation (2b), $W_{11}$ and $W_{12}$ may be enrolled in registry 770—e.g., at least to be available as reference information in a future evaluation of drift by PUF circuitry of device 700. Subsequently, respective PUF values $P'_1$ and $P'_2$ may be sampled from PUF circuits 760, 762, as shown in operation (3b). Based on $P'_1$ and $P'_2$, sampler logic 765 may determine state information $W'_{11}$ and $W'_{12}$. For example, $W'_{11}$ may be calculated as $(P'_{11} \oplus C_{11})$, and $W'_{12}$ may be calculated as $(P'_{12} \oplus C_{12})$.

Subsequently, evaluation logic 775 may perform operations (4b) through (6b) to detect for at least a threshold level of drift by PUF circuit 760. By way of illustration and not limitation, evaluation logic 775 may access registry 770 and sampler logic 765 to determine $W_{11}$, $W_{12}$, $W'_{11}$, and $W'_{12}$. An error vector $e_{11}$ may be calculated based on $W_{11}$ and $W'_{11}$, where $e_{11}$ indicates a total number of errors in $P'_{11}$. Similarly, another error vector $e_{12}$ may be calculated based on $W_{12}$ and $W'_{12}$, where $e_{12}$ indicates a total number of errors in $P'_{12}$.

At operation (6b), evaluation logic 775 may evaluate $e_{11}$—e.g., to determine whether a total number of errors of $P'_{11}$ is less than (in some embodiments, less than or equal to) $N_{str1}$. Operation (6b) may further comprise evaluating $e_{12}$ to determine whether a total number of errors of $P'_{12}$ is greater than $N_{str2}$. Where the total number of errors indicated by $e_{11}$ is less than $N_{str1}$ and the total number of errors indicated by $e_{12}$ is greater than $N_{str2}$, device 750 may perform operations (7b) to avail of an opportunity to register updated state information while drift of PUF circuitry is above some threshold (e.g., indicated by $N_{str2}$), but before an ability to correct for later, additional drift is lost. For example, evaluation logic 775 may—in response to operation (6b)—signal that registry 770 is to enroll other state information $W_{21}$ corresponding to a PUF value $P_{21}$ generated by PUF circuit 760 after PUF value $P_{11}$. Similarly, operation (7b) may include registry 770 enrolling other state information $W_{22}$ corresponding to a PUF value $P_{22}$ generated by PUF circuit 760 after PUF value $P_{11}$. In an embodiment, $P_{21}$ is $P'_{11}$ and/or $P_{22}$ is $P'_{12}$. The value $C_{21}$ shown in FIG. 7B may include, for example, error correction information which is generated based on an encoding of at least part of $P_{21}$. Alternatively or in addition, the value $C_{22}$ shown in FIG. 7B may include error correction information generated based on an encoding of at least part of $P_{22}$.

Alternatively or in addition, operation (7b) may include registry 770 receiving and enrolling a value $Q_{11}$ representing a combination of $P_{11}$ and $P_{21}$. By way of illustration and not limitation, $Q_{11}$ may be calculated as $[h(P_{21}) \oplus P_{11}]$, where $h(P_{21})$ is a hash of $P_{21}$. Similarly, registry 770 may enroll a value $Q_{12}$ representing a combination of $P_{12}$ and $P_{22}$. By way of illustration and not limitation, $Q_{12}$ may be calculated as $[h(P_{22}) \oplus P_{12}]$, where $h(P_{22})$ is a hash of $P_{22}$. The calculated values $Q_{11}$, $Q_{12}$ allow for secure recovery and use of $P_{11}$ and/or $P_{12}$ even after later additional PUF circuit drift prevents recovery of $P_{11}$ and/or $P_{12}$ being calculated based on a subsequent output from PUF circuits 760, 762.

In an embodiment, device 750 may further repeat at least some of the operations shown in FIG. 7B. For example, device 750 may further sample respective PUF values $P'_{21}$, $P'_{22}$ from PUF circuits 760, 762 and determine state information $W'_{21}$, $W'_{22}$—e.g., where $W'_{21}$ is calculated as $(P'_{21} \oplus C_{21})$ and $W'_{22}$ is calculated as $(P'_{22} \oplus C_{22})$. An error vector $e_{21}$ may be evaluated—e.g., as $(W'_{21} \oplus W_{21})$—to determine a total number of erroneous bits in $P'_{21}$. Similarly, an error vector $e_{22}$ may be evaluated—e.g., as $(W'_{22} \oplus W_{22})$—to determine a total number of erroneous bits in $P'_{22}$. Evaluation logic 775 may evaluate $e_{21}$ to determine whether a total number of errors of $P'_{21}$ is less than (or less than or equal to) $N_{str1}$. Similarly, $e_{12}$ may be evaluated to determine whether a total number of errors of $P'_{22}$ is greater than $N_{str2}$. Based on such evaluation of $e_{21}$, $e_{22}$, device 750 may determine whether to again update state information registered in registry 770.

One disadvantage of techniques such as those discussed herein with respect to device 700 is that they may rely upon storage of a value $C_x$ (e.g. $C_1$) as reference information to be subsequently accessed for evaluations—such as those of operations (3a), (4a) and/or (5a)—which are based on $P'_x$ (e.g., $P'_1$). Similarly, techniques implemented with device 750 may rely upon storage of values $C_{x1}$, $C_{x2}$ (e.g., $C_{11}$, $C_{12}$) as reference information to be subsequently accessed for evaluations—such as those of operations (3b), (4b) and/or (5b)—which are based on $P'_{x1}$ and $P'_{x2}$ (e.g., $P'_{11}$ and $P'_{12}$). Such reliance may pose a security risk at least insofar as a malicious agent could potentially access the stored $C_x$ (or $C_{x1}$ and $C_{x2}$), increasing the likelihood of such an agent determining $P_x$ (or $P_{x1}$ and $P_{x2}$).

Certain embodiments reduce this security risk by providing an alternative technique for determining an error vector $e_x$ based on a $P'_x$ value without requiring the accessing of a previously-stored $C_x$ value. To illustrate certain features of various embodiments, such alternative techniques are discussed herein with respect to the calculation of error vector $e_1$ based on value $C_1$. However, such discussion may be extended to additionally or alternatively apply to the calculation of one or more other error vectors—e.g. including $e_{11}$ and/or $e_{12}$—each based on a corresponding sampled PUF value.

For example, in the illustrative embodiment, error correction coding calculations are performed based on a random value $C_{u1}$ and the earlier-generated PUF value $P_1$ to initially calculate $C_1$. Subsequently, the alternative techniques for calculating $e_1$ may include calculating a value equal to $(e_1 \oplus C_1)$—e.g., according to the following:

$$P'_1 \oplus W_1 = P'_1 \oplus P_1 \oplus C_1 = e_1 \oplus C_1. \quad (1)$$

Error correction calculations may then be performed to recover the value of $C_{u1}$. Subsequently an encoding of $C_{u1}$ may be performed to obtain the value of $C_1$. With the value of $C_1$ obtained, the value of $e_1$ may then be calculated based on $C_1$ and the value for $(e_1 \oplus C_1)$ determined by equation (1)—e.g., according to the following:

$$(e_1 \oplus C_1) \oplus C_1 = e_1 \quad (2)$$

The calculated $e_1$ may then be used to test for drift of PUF circuitry—e.g. according to techniques discussed herein with respect to operations (6a), (7a) and/or operations (6b), (7b).

Figure 8:
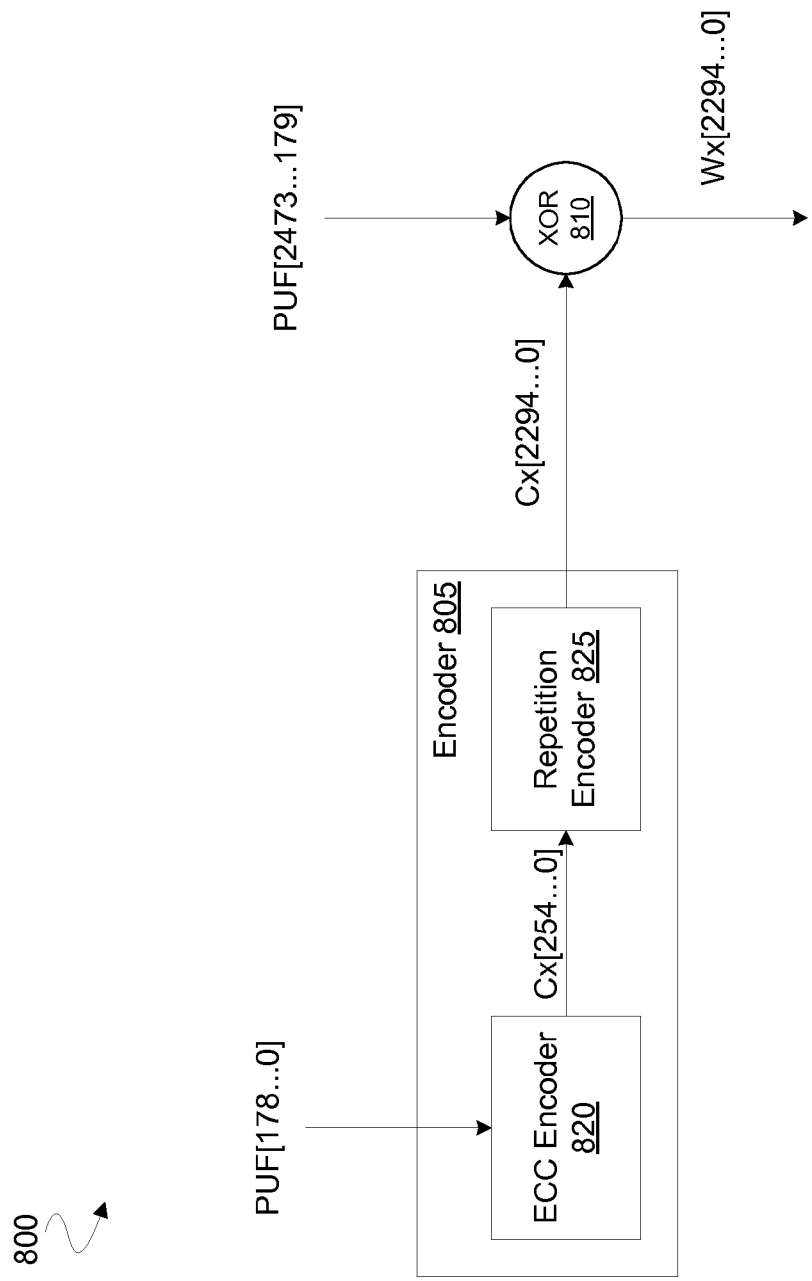
FIG. 8 is a dataflow diagram illustrating features of a device, in accordance with an embodiment, to detect drift of PUF circuitry.

FIG. 8 is a dataflow diagram illustrating a device 800 according to an embodiment for detecting drift of PUF circuitry. Device 800 may include, for example, some or all of the features of one of system 600, device 700 and device 750. In an embodiment, device 800 includes circuit logic to generate state information based on a PUF value generated by PUF circuitry (not shown).

By way of illustration and not limitation, a PUF circuit included in or coupled to device 800 may output a 2474-bit value PUF[2473 . . . 0]. A first portion of the PUF value PUF[178 . . . 0] may be provided to an encoder 805, while a second portion of the PUF value PUF[2473 . . . 179] may be provided to a logic unit 810. It is understood that the PUF value PUF[2473 . . . 179] may be considered to be its own distinct PUF value. An ECC encoder 820 uses the first portion PUF[178 . . . 0] to generate a codeword Cx[254 . . . 0]. The codeword is expanded using repetition encoder 825 to generate codeword Cx[2294 . . . 0]. Although FIG. 8 illustrates the use of a 255 bit codeword and a 8× repetition encoder, longer or shorter codewords and higher or lower repetition encoders may be used—e.g., according to the level of noise in the PUF value. Similarly, although FIG. 8 illustrates a 2474-bit PUF value, longer or shorter PUF values may be used according to the desired strength of security. Repetition encoder 825 may be replaced by other types of encoders as well. Logic unit 810 combines the second portion of the PUF value PUF[2473 . . . 179] with the codeword Cx[2294 . . . 0] to generate state information Wx[2294 . . . 0]. In the illustrated embodiment, logic unit 810 uses an XOR function to combine the two values, though other logic functions may be implemented (e.g., XNOR).

Figure 9:
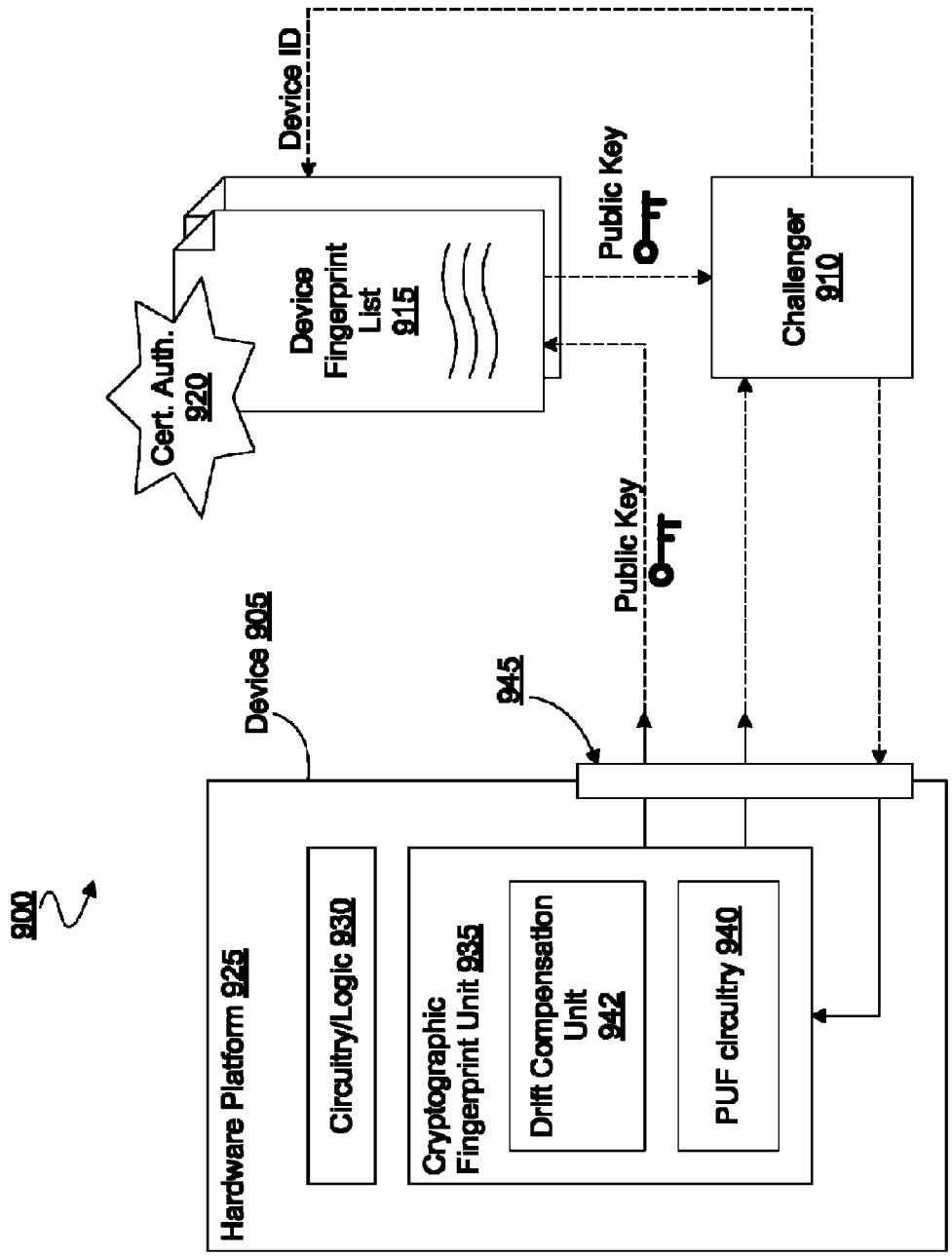
FIG. 9 is a functional block diagram illustrating a device fingerprinting infrastructure for authenticating hardware devices and deterring device subversion by substitution, in accordance with an embodiment.

FIG. 9 is a functional block diagram illustrating a device fingerprinting infrastructure 900 for authenticating hardware devices and deterring device subversion by substitution, in accordance with an embodiment of the invention. FIG. 9 illustrates one example of security operations supported by PUF circuitry (e.g., including PUF circuit 940) that is prone to drift due to hardware aging. To detect and compensate for such drift, a device 905 includes drift compensation unit 935 which, for example, includes some or all of the features of one of system 600, device 700 or device 750.

The illustrated embodiment of infrastructure 900 includes a device 905 to be authenticated, a challenger 910 interested in authenticating device 905 and a device fingerprint list 915 maintained or certified by a certifying authority 920. The illustrated embodiment of device 905 includes a hardware platform 925, primary circuitry (or function logic) 930 of the device, a cryptographic fingerprint unit 935 including a PUF circuit 940, and a input/output ("I/O") ports 945. Cryptographic fingerprint unit 935 may be implemented entirely within hardware or partially using hardware and partially using software/firmware. In either embodiment, the PUF circuit 940, which may be implemented using any PUF circuit having suitably small intra-device variation and sufficiently large inter-device variation, including but not limited to PUF circuits 100, 200, 300, 400, along with primary circuitry 930 are both integrated into hardware platform 925. For example, if device 905 is a semiconductor based integrated circuit ("IC"), then PUF circuit 940 may be integrated into the semiconductor die including circuitry 930. Of course, other components of cryptographic fingerprint unit 935 (described below in connection with FIG. 9) may also be integrated into hardware platform 925 of device 905.

Device 905 may represent any device of which hardware authentication during the deployment phase of its lifecycle is desired. For example, device 905 may represent a CPU, a microcontroller, video card, or virtually any hardware device, which may or may include software/firmware code. Hardware platform 925 may include a semiconductor die of an application specific IC ("ASIC") or general purpose IC (e.g., CPU), a field programmable gate array ("FPGA"), a printed circuit board ("PCB"), or otherwise. It should be appreciated that hardware platform 925 may include memory units for storing executable code (e.g., software or firmware) for operating primary circuitry 930 and/or portions of cryptographic fingerprint unit 935.

External communication with cryptographic fingerprint unit 935 is conducted through I/O ports 945. In one embodiment, I/O ports 945 may include existing industry standard test ports, such as a Joint Test Action Group ("JTAG") test access port ("TAP"). Of course, external communications may be multiplexed over standard data ports or other types of test ports.

Techniques and architectures for operating physically unclonable function circuitry are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. An apparatus comprising:
   integrated circuitry including:
   a physically uncloneable function (PUF) circuitry to generate a first PUF value;
   a sampler circuit coupled to the PUF circuitry, the sampler circuit configured to calculate first state information based on the first PUF value, wherein the first state information corresponds to a first error correction strength, the sampler circuit further to register the first state information as at least part of reference information, the sampler circuit to calculate second state information, after the first state information is registered, based on a second PUF value output from the PUF circuitry subsequent to the first PUF value; and
   an evaluation circuit coupled to receive the first state information and the second state information from the sampler circuit, the evaluation circuit configured to detect drift of the PUF circuitry based on the first state information and the second state information, including the evaluation circuit to determine whether a threshold error correction strength is exceeded concurrent with a magnitude of error being less than the first error correction strength, and in response to detecting the drift of the PUF circuitry, the evaluation circuit further to:
   signal calculation of a first value representing a combination of the first PUF value and another PUF value generated by the PUF circuitry subsequent to the first PUF value; and
   signal registration of an update to the reference information based on the other PUF value, the update to enroll the first value to enable a recovery of the first PUF value.

2. The apparatus of claim 1, wherein the sampler circuit to calculate the first state information further based on error correction information generated based on the first PUF value.

3. The apparatus of claim 1, wherein the sampler circuit to calculate the first state information further based on a random number.

4. The apparatus of claim 1, wherein a first PUF circuit of the PUF circuitry generates the first PUF value, and wherein a second PUF circuit of the PUF circuitry generates the second PUF value.

5. The apparatus of claim 4, further comprising:
   the sampler circuit further to calculate third state information based on a third PUF value output from the first PUF circuitry subsequent to the first PUF value, wherein the third state information corresponds to the first error correction strength, the sampler circuit further to calculate fourth state information based on a fourth PUF value output from the second PUF circuit subsequent to the second PUF value, wherein the evaluation circuit to detect the drift of the PUF circuitry further based on the third state information and the fourth state information.

6. The apparatus of claim 5, wherein the evaluation circuit to detect the drift of the PUF circuitry includes:
   the evaluation circuit to calculate a first error vector based on the first state information and the third state information;
   the evaluation circuit to detect whether the first error vector exceeds a value representing the first error correction strength;
   the evaluation circuit to calculate a second error vector based on the second state information and the fourth state information; and
   the evaluation circuit to detect whether the second error vector exceeds a value representing the threshold error correction strength.

7. The apparatus of claim 1, wherein the other PUF value includes the second PUF value.

8. The apparatus of claim 1, wherein the evaluation circuit to signal calculation of the first value representing the combination of the first PUF value and the other PUF value includes the evaluation circuit to signal calculation of a hash of the other PUF value.

9. The apparatus of claim 1, wherein the evaluation circuit to signal registration of the update includes the evaluation circuit to signal registration of the second state information.

10. The apparatus of claim 1, wherein the evaluation circuit to signal registration of the update includes the evaluation circuit to signal registration of the value representing the combination of the first PUF value and the other PUF value.

11. A method comprising:
    calculating first state information based on a first physically uncloneable function (PUF) value output from PUF circuitry, wherein the first state information corresponds to a first error correction strength;
    registering the first state information as at least part of reference information;
    after registering the first state information, calculating second state information based on a second PUF value output from the PUF circuitry subsequent to the first PUF value;
    detecting drift of the PUF circuitry based on the first state information and the second state information, including determining whether a threshold error correction strength is exceeded concurrent with a magnitude of error being less than the first error correction strength; and
    in response to detecting the drift of the PUF circuitry:
    calculating a first value representing a combination of the first PUF value and another PUF value generated by the PUF circuitry subsequent to the first PUF value; and
    registering an update to the reference information based on the other PUF value, wherein the update enrolls the first value to enable a recovery of the first PUF value.

12. The method of claim 11, wherein a first PUF circuit of the PUF circuitry generates the first PUF value, and wherein a second PUF circuit of the PUF circuitry generates the second PUF value.

13. The method of claim 12, further comprising:
calculating third state information based on a third PUF value output from the first PUF circuitry subsequent to the first PUF value, wherein the third state information corresponds to the first error correction strength; and
calculating fourth state information based on a fourth PUF value output from the second PUF circuit subsequent to the second PUF value, wherein detecting the drift of the PUF circuitry is further based on the third state information and the fourth state information.

14. The method of claim 13, wherein detecting the drift of the PUF circuitry includes:
calculating a first error vector based on the first state information and the third state information;
detecting whether the first error vector exceeds a value representing the first error correction strength;
calculating a second error vector based on the second state information and the fourth state information; and
detecting whether the second error vector exceeds a value representing the threshold error correction strength.

15. The method of claim 11, wherein registering the update includes registering the second state information.

16. The method of claim 11, wherein registering the update includes registering the value representing the combination of the first PUF value and the other PUF value.

17. A non-transitory computer-readable storage medium having stored thereon instructions which, when executed by one or more processing units, cause the one or more processing units to perform a method comprising:
calculating first state information based on a first physically uncloneable function (PUF) value output from PUF circuitry, wherein the first state information corresponds to a first error correction strength;
registering the first state information as at least part of reference information;
after registering the first state information, calculating second state information based on a second PUF value output from the PUF circuitry subsequent to the first PUF value;
detecting drift of the PUF circuitry based on the first state information and the second state information, including
determining whether a threshold error correction strength is exceeded concurrent with a magnitude of error being less than the first error correction strength; and
in response to detecting the drift of the PUF circuitry:
calculating a first value representing a combination of the first PUF value and another PUF value generated by the PUF circuitry subsequent to the first PUF value; and
registering an update to the reference information based on the other PUF value, wherein the update enrolls the first value to enable a recovery of the first PUF value.

18. The computer-readable storage medium of claim 17, wherein a first PUF circuit of the PUF circuitry generates the first PUF value, and wherein a second PUF circuit of the PUF circuitry generates the second PUF value.

19. The computer-readable storage medium of claim 18, the method further comprising:
calculating third state information based on a third PUF value output from the first PUF circuitry subsequent to the first PUF value, wherein the third state information corresponds to the first error correction strength; and
calculating fourth state information based on a fourth PUF value output from the second PUF circuit subsequent to the second PUF value, wherein detecting the drift of the PUF circuitry is further based on the third state information and the fourth state information.

20. The computer-readable storage medium of claim 19, wherein detecting the drift of the PUF circuitry includes:
calculating a first error vector based on the first state information and the third state information;
detecting whether the first error vector exceeds a value representing the first error correction strength;
calculating a second error vector based on the second state information and the fourth state information; and
detecting whether the second error vector exceeds a value representing the threshold error correction strength.

* * * * *